United States Patent
Sienel et al.

[11] Patent Number: 5,589,526
[45] Date of Patent: Dec. 31, 1996

[54] MASTER BATCH COMPOSITIONS CONTAINING ORGANIC PEROXIDES

[75] Inventors: Günter Sienel, Ebenhausen; Maximilian Dorn, Grünwald; Heinz Zimmermann, München, all of Germany

[73] Assignee: Peroxid-Chemie GmbH, Pullach, Germany

[21] Appl. No.: 543,005

[22] Filed: Oct. 13, 1995

[30] Foreign Application Priority Data

Oct. 19, 1994 [DE] Germany .................. 44 37 465.8

[51] Int. Cl.⁶ .................. C08K 5/14; C08L 9/00
[52] U.S. Cl. .................. 523/351; 524/425; 524/442; 525/211; 525/216
[58] Field of Search .................. 523/351; 524/81, 524/425, 442; 525/211, 216

[56] References Cited

U.S. PATENT DOCUMENTS

| | | | |
|---|---|---|---|
| 5,238,978 | 8/1993 | Stein | 523/351 |
| 5,384,366 | 1/1995 | Paganelli | 523/351 |
| 5,430,077 | 7/1995 | Unger | 523/351 |
| 5,482,993 | 1/1996 | Hiraoka | 524/189 |

FOREIGN PATENT DOCUMENTS

| | | |
|---|---|---|
| 0146068 | 6/1985 | European Pat. Off. |
| 0575801 | 12/1993 | European Pat. Off. |
| 9429372 | 12/1994 | WIPO |

OTHER PUBLICATIONS

Data Base WPI Week 8828 Derwent Publications Ltd., London, GB; –AN88–195785 & JP–A–63 135 238 (Daicel Huls KK) *Zusammenfassung*.

Data Base WPI Week 8846 Derwent Publications Ltd., London GB; –AN–88–326882 & JP–A–63 241 051 (Toyoda Gosei KK) *Zusammenfassung*.

*Primary Examiner*—Tae Yoon
*Attorney, Agent, or Firm*—Felfe & Lynch

[57] ABSTRACT

The present invention provides a master batch composition based on elastomeric carriers, comprising an organic peroxide, a plasticizer and a filling material and optionally further additives compatible with the organic peroxide, wherein, in addition to the elastomeric carrier, it contains a polyoctenamer.

The present invention also provides a process for the production of a master batch composition, wherein (a) the elastomeric carrier, the polyoctenamer, the plasticizer and optionally a part of the filling material or filling material mixture are homogeneously mixed and thereafter (b) the filling material or the filling material mixture or possibly the remaining amounts thereof, together with the organic peroxide, are incorporated at a temperature below the decomposition temperature of the peroxide.

On the basis of its properties and of the simple and reliable production thereof, the master batch composition according to the present invention is very suitable as a modification agent and especially as a cross-linking initiator for the further working up of elastomeric mixtures.

19 Claims, 1 Drawing Sheet

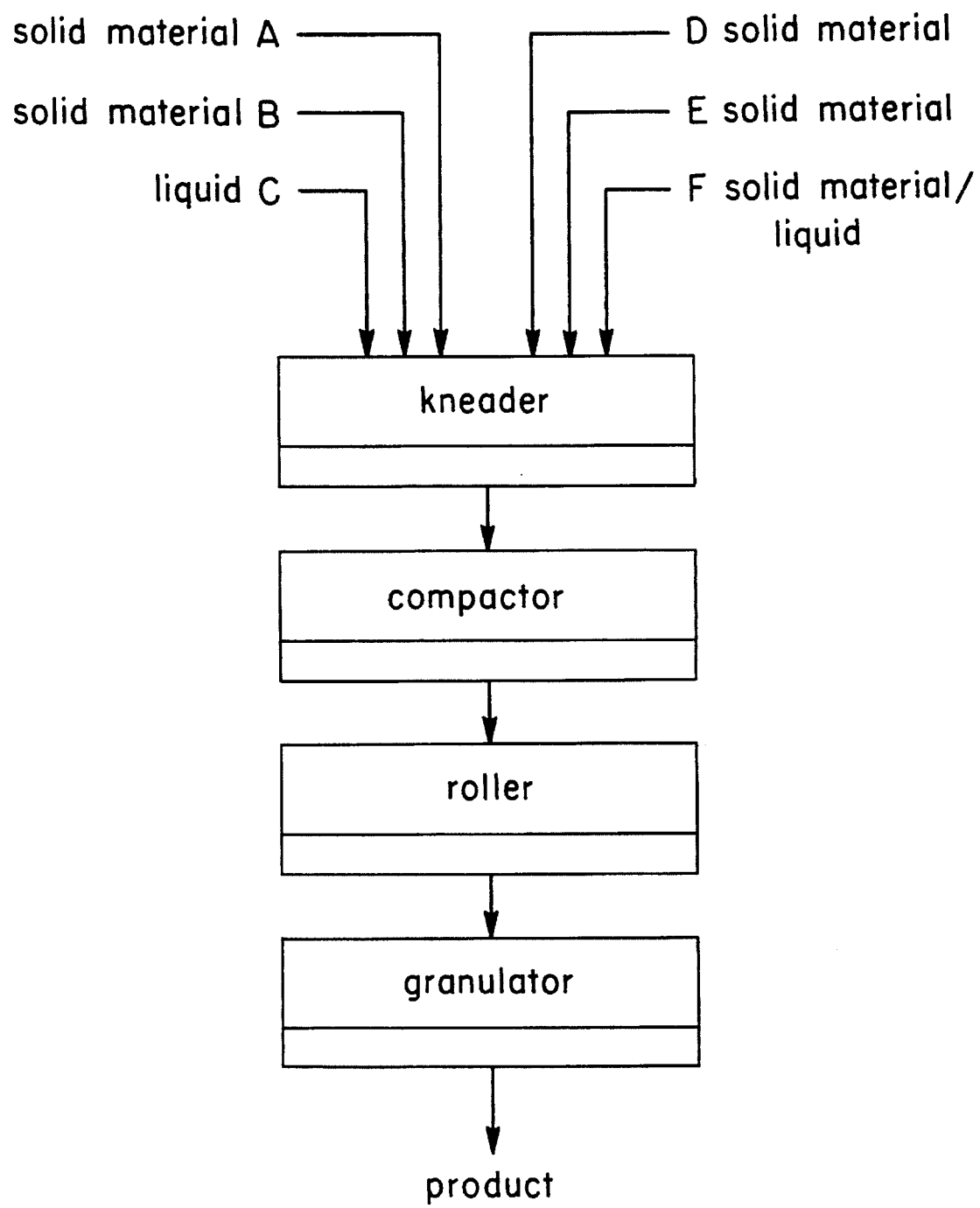

MASTER BATCH COMPOSITIONS CONTAINING ORGANIC PEROXIDES

BACKGROUND OF THE INVENTION

The present invention is concerned with master batch compositions comprising an organic peroxide, a plasticiser and a filling material and possibly further additives compatible with the organic peroxide.

Masterbatch is a designation frequently used in the rubber and plastics industries for pre-mixtures and primary mixtures of additive materials, for example anti-oxidants, inhibitors, mastication adjuvants and the like, in concentrated rubber and plastics mixtures. In the form of master batch compositions, the additives necessary for further working up, although only present in small amounts, can be more easily dosed and homogeneously incorporated.

The master batch compositions, which contain various additives, for example organic cross-linking peroxides, which are thereby more easily dosable and homogeneously workable, are to fulfil various requirements: they are, for example, independently of the nature of the elastomeric carrier and of the nature of the organic peroxide (in solid or liquid form), to be easily and reliably preparable and workable and also to show, in the case of a high proportion of filling materials, a good elasticity and incorporability into elastomers of the rubber industry and are not to bleed out (migration of the additive materials, for examle of the peroxide, on to the surface) and are to be storage-stable.

According to DE-A-21 23 214, rubber chemicals are used in the form of granulated mixtures of elastomers, the rubber chemicals in question and possibly dispersion agents. Because these mixtures are used in the granulated form the master batch compositions are readily capable of being mixed in and pollution due to dust and smell is to be avoided.

EP-A-0 423 639 and U.S. Pat. No. 5,238,978 describe master batch compositions in which 10 to 70% by weight of an organic peroxide is homogeneously dispersed in a polycaprolactone carrier.

It is an object of the present invention to provide master batch compositions which can be produced in a simple and reliable way with the use of conventional apparatus known for such compositions, for example kneaders, and with which there is obtained as many as possible of the properties desired for such master batch products. This object is achieved by means of the present invention.

The various features of novelty which characterize the invention are pointed out with particularity in the claims annexed to and forming a part of this specification. For a better understanding of the invention, its operating advantages and specific objects obtained by its use, references should be had to the accompanying drawings and descriptive matter in which there is illustrated and described a preferred embodiment of the invention.

BRIEF DESCRIPTION OF THE DRAWINGS

FIG. 1 schematically illustrates in block diagram form a process of the invention for providing a product of the invention.

THE INVENTION

According to the present invention, there is provided a master batch composition based on elastomeric carriers, comprising an organic peroxide, a plasticiser and a filling material and optionally further additives compatible with the organic peroxide, wherein, in addition to the elastomeric carrier, it contains a trans-polyoctenamer.

The present invention also provides a process for the production of a master batch composition according to the present invention, wherein (a) the elastomeric carrier, the polyoctenamer, the plasticiser and optionally a part of the filling material or filling material mixture are homogeneously mixed and thereafter (b) the filling material or the filling material mixture or possibly the remaining amounts thereof, together with the peroxide, are incorporated at a temperature below the decomposition temperature of the peroxide.

Surprisingly, we have found that, with the master batch compositions according to the present invention, which contain a combination of the elastomeric carrier with trans-polyoctenamer, a combination of properties can be obtained which makes them very suitable for use especially in rubber mixtures and which can be produced in a simple and reliable way.

Thus, in spite of high proportions of filling materials, the master batch compositions according to the present invention show a sufficient elasticity and thus a good handling capability, for example in granulated form, and a good capability to be mixed into elastomers used in the rubber industry. They do not bleed out, i.e. no migration of the additive materials takes place, especially of the peroxides or of the filling materials, for example chalk or silicic acid, which impart a white color to the surface of the compositions present, for example, as granulate, strips or rough sheets. As elastomeric carriers, there can essentially be used all rubber elastomers and especially also cold-flowing rubber, for example cold-flowing EPDM. The compositions and their producability are independent of the aggregate state of the organic peroxide (solid or liquid). With the use of appropriate filling materials, for example chalk and/or silicic acid, there can also be produced pure white compositions with a high peroxide content which can easily be colored with coloring materials compatible with the peroxide. The compositions are extremely storage stable. They can be produced in a simple, reliable and economic way with the use of conventional apparatus, for example of kneaders and rollers conventional herefor without pre-compounding being necessary.

Having regard to the purpose of use of the master batch compositions according to the present invention for the modification of polymers, especially of rubbers, by cross-linking, there is preferably used a so-called cross-linking peroxide, i.e. a peroxide acting as cross-linking initiator. Such peroxides are preferably selected from the group 2,5-dimethylhexane-2,5-di-tert.-butyl peroxide (DHBP), 1,1-bis-(tert.-butyl-peroxy)-3,3,5-trimethylcyclohexane (TMCH), n-butyl-4,4-bis-(tert.-butylperoxy) valerate (NBV), ethyl 3,3-bis-(tert.-butylperoxy) butyrate (EBU), dicumyl peroxide (DCUP), 2,5-dimethyl-2,5-di-(tert.-butylperoxy)-hex-3-yne (DYBP), di-(2-tert.-butylperoxy-isopropyl)-benzene (DIPP), di-(tert.-butyl) peroxide (DTBP) and/or tert.-butylcumyl peroxide (BCUP) and/or perketals, for example 1,1-bis-(ter.-butylperoxy)-3,3,5-trimethylcyclohexane (TMCH), n-butyl-4,4-bis-(tert.-butylperoxy) valerate (NBV) and/or ethyl 3,3-bis-(tert.-butylperoxy)-butyrate (EBU). Two or more peroxides can also be used in the mixture.

The peroxides are preferably used in an amount of from 30 to 50% by weight and especially in an amount of from 40 to 45% by weight, referred to the total master batch composition. As elastomeric carriers for the master batch compositions according to the present invention, there can, in principle, be used all elastomers, especially rubbers, and more especially those which are conventionally used for master batch compositions. Such elastomers include, for example, acrylonitrile-butadiene rubber (NBR), chloroprene rubber (CR), butyl rubber (IIR), urethane rubber (AU polyester basis, EU polyester basis), silicone rubber (Si), fluorocarbon rubber (CFM, FPM), chlorosulphonated polyethylene (CSM), acrylate rubber (ANM, ACM), butadiene-vinylpyridine rubber (PBR), carboxylate rubber, epichlorohydrin rubber (CO, ECO), propylene oxide rubber (PO), ethylene-vinyl acetate co-polymers (EVA, EVM), ethylene-propylene rubber (EPM, EPDM), polysulphide rubber (TM), thermoplastic rubber (TPE) and polyester rubber. Mixtures of two or more of the elastomers can also be used. Appropriate elastomers are, for example, the special rubbers described by W. Kleemann, "Mischunge für die Elastverarbeitung", pub. VEB Deutscher Verlag für Grundstoff Industrie, Leipzig, 1982, pages 80 to 116).

As elastomers which are especially preferred according to the present invention, there are to be mentioned ethylene-propylene-diene terpolymers (EPDM) and ethylene-vinyl acetate polymers (EVA, EVM).

Having regard to a reduction of cost, the use of cold-flowing rubber, for example cold-flowing EPDM, is preferred because, as a rule, the proportion of filling materials can thereby be increased.

As plasticisers, in principle there can be used all plasticisers conventional for elastomer (rubber) mixtures (cf., for example, W. Kleemann, loc. cit., pages 117 to 130). The plasticiser must only fulfil the requirement that the master batch compositions remain plastic. Plasticisers which are especially preferred according to the present invention include n-alkylbenzenes which are commercially available, for example under the trade name of Marlican® (Hüls Aktiengesellschaft).

As filling materials, there can also, in principle, be used all filling materials used for elastomer mixtures (polyblends) (cf., for example, W. Kleemann, loc. cit., pages 131 to 180). For this purpose, chalk and silicic acid, as well as mixtures thereof, have proved to be especially preferable. The filling materials have the advantage that they give rise to a white color which results in a more uniform appearance and in a better colorability by colored materials compatible with peroxides.

The most preferable choice of plasticisers and/or filling materials can also depend upon the other components. Thus, for example, silicic acid is more favorable for the use of liquid peroxide since a better absorption can be achieved therewith, whereas, in the other cases, as a rule calcium carbonate (chalk, for example the product commercially available under the trade name Socal® (Solvay & Co.)) is preferred as filling material for the achievement of a white color or represents at least a part of the filling material, for example in admixture with silicic acid.

In order to avoid a decomposition of the peroxide contained in the master batch compositions, the compositions are preferably free of heavy metals. In this way, a monitoring of the temperature is no longer of critical importance because, due to the presence of heavy metals in the compositions, the temperature at which the peroxides can decompose can be substantially lowered.

The master batch composition according to the present invention can also contain still further additives compatible with the organic peroxides. Such additives include, for example, rubber chemicals used for elastomers (rubber) mixtures, for example anti-oxidants, anti-ozone agents, anti-static agents, coloring materials, pigments, optical brighteners, heat stabilizers, light stabilizers, flame inhibitors and cross-linking accelerators, as well as mixtures thereof. These additives are preferably used in an amount usual for such additives and especially in an amount which does not lead to a substantial decomposition of the peroxides.

In the master batch compositions according to the present invention, the ratio (in parts by weight) of elastomeric carrier/polyoctenamer is preferably in the range of from 1/3 to 3/1. The most preferred ratio depends especially also upon the nature of the elastomer (rubber) used as carrier. As a rule, however, outside of the mentioned preferred ranges, less desirable are obtained with regard to the properties and/or the economy of the master batch compositions.

The amount of the filling material or of the filling material mixture preferably lies in the range of from 25 to 50% by weight, referred to the total master batch composition. For economic reasons, it can thereby be preferable to use as much filling material as possible in relation to the smallest possible amount of elastomer (rubber) because the elastomeric component is, as a rule, considerably more expensive than the filling material.

The master batch compositions according to the present invention are preferably stored and sold in the form of rough sheets, rough sheets cut into strips or especially in granulated form and are preferably used as granulate.

The production of the master batch products according to the present invention can, as a rule, take place by conventional processes suitable for the production of polymer blends based on elastomer (rubber).

In an especially preferred process for the production of the master batch products according to the present invention, (a) the elastomeric carrier, the polyoctenamer, the plasticiser and possibly a part of the filling material or filling material mixture are homogeneously mixed and thereafter (b) the filling material or the filling material mixture or possibly the remaining amount thereof, together with the peroxide, are incorporated into the mixture obtained according to (a) at a temperature below the decomposition temperature of the peroxide.

In the case of this process, it has proven to be advantageous, in the case of the use of ethylene-vinyl acetate co-polymer (EVA) as elastomeric carrier and of an organic peroxide in liquid form, to allow the EVA to swell with up to 30% and preferably with about 30% by weight of the liquid peroxide and then to use the so pre-swollen EVA in process step (a).

The temperature at which the peroxides are incorporated (process step (b)) is chosen such that the elastomer (rubber) remains elastic (in the case of too low temperatures, the composition can become undesirably gritty), but, on the other hand, also no decomposition of the peroxide takes place (which could be the case at high temperatures). Therefore, the temperature is preferably so chosen that it lies as far as possible below the self-decomposition temperature of the peroxide but still in a temperature range in which the elastomer remains elastic. This temperature preferably lies in a range of from 50° to 60° C. and especially at 50° to 55° C. A temperature control in process step (b) can preferably be carried out, for example, by means of thermal probes present in the kneaders.

The process step (a) and/or (b) can be carried out in conventional kneaders appropriate therefor, for example in a double-mantle kneader. After process step (b), the mixture is worked up to rough sheets, for example by means of a press roller appropriate therefor, and converted into a granulate by means of a granulator.

Having regard to the process conditions according to the present invention, master batch compositions can be produced in a simple, economic and reliable way. Therefore, the master batch compositions according to the present invention represent appropriate master batch compositions on the basis of their above-mentioned advantageous property combination for use as modification agents and especially as cross-linking initiators for polymers (especially elastomers).

The following Examples are given for the purpose of illustrating the present invention without limiting it thereto. If not stated otherwise, the statements of amounts and percentages are by weight.

EXAMPLE 1

Production of a Master Batch Composition According to the Present Invention with the Use of a Solid Peroxide (a) In a double-mantle kneader heated to a temperature of 70° to 75° C. are placed EDPM, trans-polyoctenamer and plasticiser (n-alkylbenzene) and mixed until homogeneous. Into this mixture are incorporated 30% of the filling material or filling material mixture intended for the composition until a homogeneous mixture has been obtained.

(b) The temperature of the kneader used in step (a) is adjusted to 60° C. by cooling or heating. Thereafter, the remaining amount of the filling material or filling material mixture is so dosed in synchronously with the organic peroxide that a temperature of 50° to 55° C. is maintained. After homogenization of the mixture, the mass obtained is removed manually or mechanically at 20° to 30° C. from the kneader and rolled by means of a pressure roller to give rough sheets of any desired thickness. After cooling, the rough sheets can be cut up into strips and/or granulated.

EXAMPLE 2

Production of Master Batch Compositions According to the Present Invention with EVA as Carrier Material, With the Use of Liquid Organic Peroxides (a) In the kneader used in Example 1, is placed EVA in the form of a granulate and allowed to swell at a temperature of <60° C. with about 30% of the liquid peroxide in the course of 1.5 hours (this pre-treatment of the EVA can also be carried out outside of the kneader used in the following step (b) in a vessel separate therefrom).

(b) The temperature of the kneader content obtained after (a) is adjusted to 50° to 60° C. and then the trans-polyoctenamer and plasticiser (n-alkylbenzene) admixed until homogeneous. With temperature control, the filling material or filling material mixture and the remaining amount of the peroxide are then dosed in synchronously with continuous kneading. After a homogeneous mass has been obtained, the mixture is then rolled out to give a rough sheet and/or granulate as described in Example 1 (b).

In the following Table 1 is given a master batch composition according to the present invention (based on EVA as elastomeric carrier and DYBP as liquid peroxide; 7 l kneader, batch=2600 g) which was worked up according to the process of Example 2.

In the following Table 2 are given master batch compositions according to the present invention based on EPDM as elastomeric carrier and various solid or liquid peroxides which have been incorporated as described in Example 1 (for solid peroxides) or as in Example 2 (for liquid peroxides).

FIG. 1 of the accompanying drawings is a schematic block flow scheme of the process carried out in Example 1 or 2 (the letters refer to the components given in the following Table 2).

TABLE 1

| based on EVA | DYBP-35-MB2 |
| --- | --- |
| Levapren ® 400 | 22% |
| Vestenamer ᴿ 6213 | 11% |
| Marlican ® | 1% |
| Socal ® U 1 | 14.35% |
| silicic acid HDK | 15.35% |
| DYBP - 96.5% | 36.3% |

TABLE 2

| Product designation | A Buna AP (kg) | B Vestenamer (kg) | C Marlican (kg) | D Socal U 1 (kg) | E silicic acid (kg) | F org. perox. (kg) |
| --- | --- | --- | --- | --- | --- | --- |
| DIPP-40-MB | 8.8 | 4.0 | 8.0 | 27.2 | — | DIPP-2 (solid) 32 |
| NEV-40-MB | 8.0 | 4.0 | 4.8 | 12.8 | 15.6 | NBV (liquid) 34.8 |
| DCUP-40-MB | 9.6 | 10.4 | 5.6 | 20.8 | — | DCUP (solid) 33.6 |
| DHBP-40-MB | 8.0 | 4.0 | 2.4 | 12.4 | 17.6 | DHBP (liquid) 35.6 |
| DYBP-40-MB | 4.0 | 12.0 | 2.4 | 12.0 | 12.0 | DYBP (liquid) 37.6 |

EXAMPLE 3

Production of DHBP-40-MB: Comparative Examples Batch Sizes

| raw materials | Example 3A | Example 3B |
| --- | --- | --- |
| EDPM | 260 (10%) | 390 (15%) |
| trans-polyoctenamer | 130 ( 5%) | — |
| Marlican | 78 ( 3%) | 78 ( 3%) |
| chalk | 403 (15.5%) | 403 (15.5%) |
| silicic acid HDK | 572 (22%) | 572 (22%) |
| DHBP - 90% | 1157 (44.5%) | 1157 (44.5%) |
| total (g) | 2600 (100%) | 2600 (100%) |

Experimental Carrying Out for Example 3A

A 7 l trough kneader is heated to 70° to 75° C. and, with kneading, the total amount of rubber and trans-polyoctenamer, as well as Marlican, added thereto. After about 0.5 hours, a homogeneous mixture is obtained. Subsequently, about 300 g (corresponding to one third) of the above-given chalk-silicic acid mixture are added thereto with further kneading.

With switching on of water cooling, the homogeneous kneader contents are cooled to about 55° C. Then, with continuous kneading and temperature control, the remaining amount of the chalk-silicic acid mixture is so dosed in synchronously with the organic peroxide (DHBP) that the temperature in the kneader does not exceed 55° C.

The necessary addition time is about 0.5 hours. The homogeneous master batch is cooled to about 30° C. and, while still warm, removed from the kneader and rolled to a rough sheet.

Experimental Carrying Out for Example 3B

In the case of this Example, the procedure is as described in Example 3A but without trans-polyoctenamer.

In the case of the synchronous addition of the organic peroxide and of the chalk-silicic acid mixture, it is shown that a coming together of the individual components to give a homogeneous mixture does not take place. The kneader content consists of a crumbly mass from which a rough sheet cannot be produced.

It will be understood that the specification and examples are illustrative but not limitative of the present invention and that other embodiments within the spirit and scope of the invention will suggest themselves to those skilled in the art.

We claim:

1. A master batch composition comprising:
   an elastomeric carrier;
   an organic peroxide in an amount of from 30 to 50% by weight based on the master batch composition;
   a plasticizer;
   a filling material; and optionally further additives compatible with the organic peroxide, wherein in addition to the elastomeric carrier, the composition contains a polyoctenamer.

2. The master batch composition of claim 1 wherein the organic peroxide is a cross-linking peroxide.

3. The master batch composition of claim 1, wherein the organic peroxide is 2,5-dimethylhexane-2,5-di-tert.-butyl peroxide (DHBP), 1,1-bis-(tert.-butyl-peroxy)-3,3,5-trimethylcyclohexane (TMCH), n-butyl-4,4-bis-(tert.-butylperoxy) valerate (NBV), ethyl 3,3-bis-(tert.-butylperoxy) butyrate (EBU), dicumyl peroxide (DCUP), 2,5-dimethyl-2,5-di-(tert.-butylperoxy)-hex-3-yne (DYBP), di-(2-tert.-butylperoxyisopropyl)-benzene (DIPP), di-(tert.-butyl)-peroxide (DTBP) or tert.-butylcumyl peroxide (BCUP).

4. The master batch composition of claim 1, wherein the elastomeric carrier is one or more elastomers selected from the group consisting of acrylonitrile butadiene rubber (NBR), chloroprene rubber (CR), butyl rubber (IIR), urethane rubber (AU on polyester basis, EU on polyester basis), silicone rubber (Si), fluorocarbon rubber (CFM, FPM), chlorosulphonated polyethylene (CSM), acrylate rubber (ANM, ACM), butadienevinylpyridine rubber (PBR), carboxylate rubber, epichlorohydrin rubber (CO, ECO), propylene oxide rubber (PO), ethylene-vinyl acetate co-polymer (EVA), ethylenepropylene rubber (EPM, EPDM), polysulphide rubber (TM), thermoplastic rubber (TPE) and polyester rubber.

5. The master batch composition of claim 1 wherein the elastomeric carrier is an ethylene-propylenediene terpolymer and/or ethylene-vinyl acetate copolymer.

6. The master batch composition of claim 1 wherein the elastomeric carrier is a cold-flowing elastomer.

7. The master batch composition of claim 1 wherein the plasticizer is an n-alkylbenzene.

8. The master batch composition of claim 1 wherein the filling material contains silicic acid and/or chalk.

9. The master batch composition of claim 1 wherein it is free of heavy metals.

10. The master batch composition of claim 1 wherein the ratio of elastomeric carrier/polyoctenamer is 1/3 to 3/1.

11. The master batch composition of claim 1 containing the filling material/filling material mixture in an amount of from 25 to 50% by weight, referred to the total master batch composition.

12. The master batch composition of claim 1 in granulated form.

13. A process for the production of a master batch composition of claim 1, comprising: (a) mixing the elastomeric carrier, the polyoctenamer, the plasticizer and optionally a part of the filling material or filling material mixture mixed to form a homogenous mixture; and (b) incorporating into the homogenous mixture the filling material or the filling material mixture or possibly the remaining amounts thereof, together with the organic peroxide, at a temperature below the decomposition temperature of the peroxide.

14. The process of claim 13 wherein the elastomeric carrier is ethylene-vinyl acetate co-polymer (EVA) and prior to step (a) EVA is allowed to pre-swell with about 30% by weight of the peroxide which is liquid.

15. The process of claim 13 wherein process step (b) is conducted at a temperature of from 50° to 60° C.

16. The process of claim 15 wherein the temperature is from 50° to 55° C.

17. The process of claim 13 wherein the mixing in step (a) is performed in a kneader.

18. The process of claim 13 further comprising working up the mixture obtained after process step (b) to give a rough sheet.

19. The process of claim 13 wherein the mixture obtained after process step (b) is converted into a granulate.

\* \* \* \* \*

UNITED STATES PATENT AND TRADEMARK OFFICE
CERTIFICATE OF CORRECTION

PATENT NO. : 5,589,526
DATED : December 31, 1996
INVENTOR(S) : Gunter SIENEL et al.

It is certified that error appears in the above-indentified patent and that said Letters Patent is hereby corrected as shown below:

In column 1, line 28, change "examle" to -- example --.

In column 4, line 15, after "desirable" insert -- results --.

In column 6, line 16, after "Vestenamer" change " R " to -- ® --.

In column 6, line 30, change "NEV-40-MB" to -- NBV-40-MB --.

In column 6, line 50, change "EDPM" to -- EPDM --.

Signed and Sealed this

Ninth Day of November, 1999

Attest:

Q. TODD DICKINSON

Attesting Officer

Acting Commissioner of Patents and Trademarks